Oct. 30, 1928.
H. PERROT
1,689,749
VEHICLE
Filed Feb. 12, 1925    3 Sheets-Sheet 3
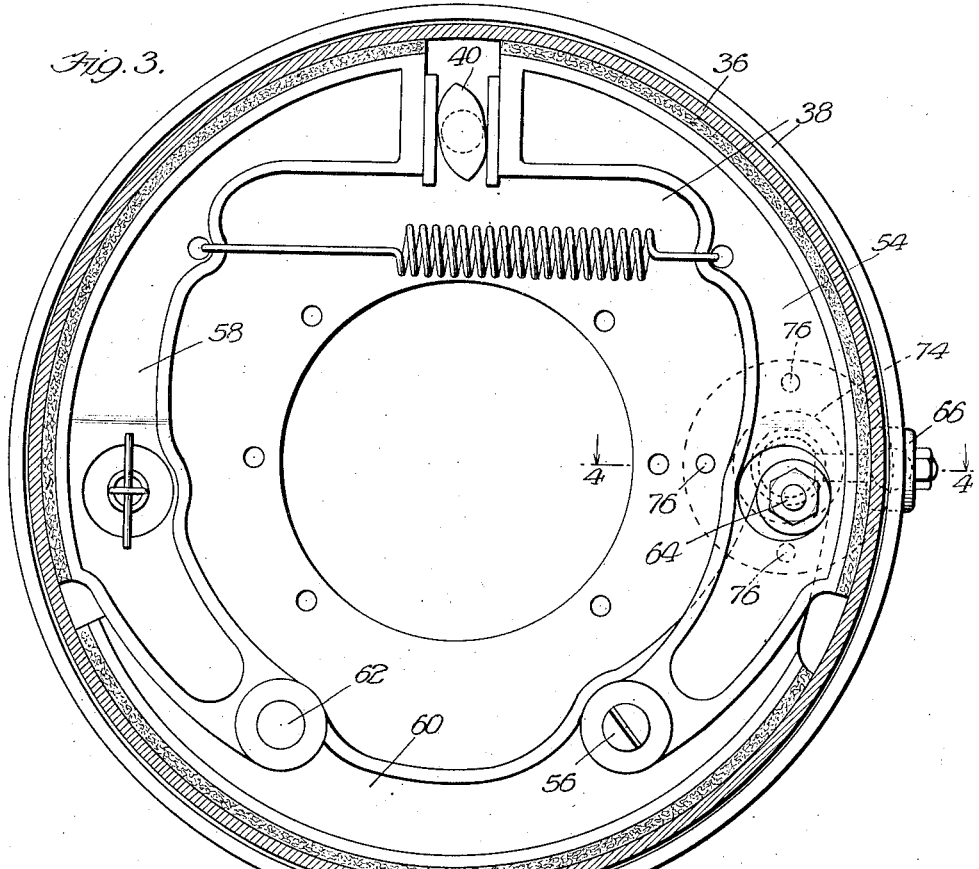
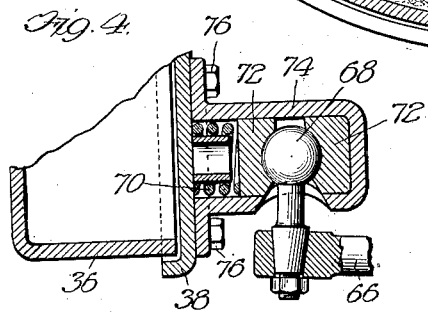
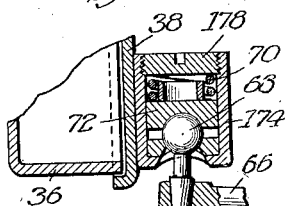
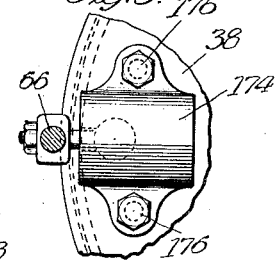
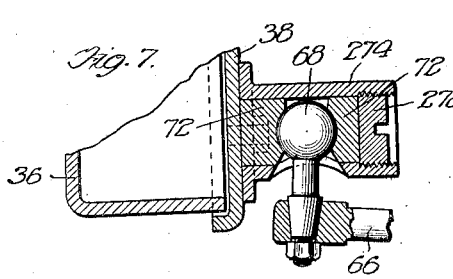
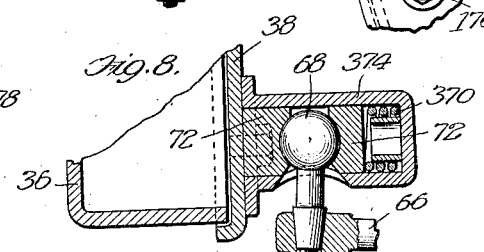
Inventor
Henri Perrot
By M. W. McConkey
Atty Patented Oct. 30, 1928.

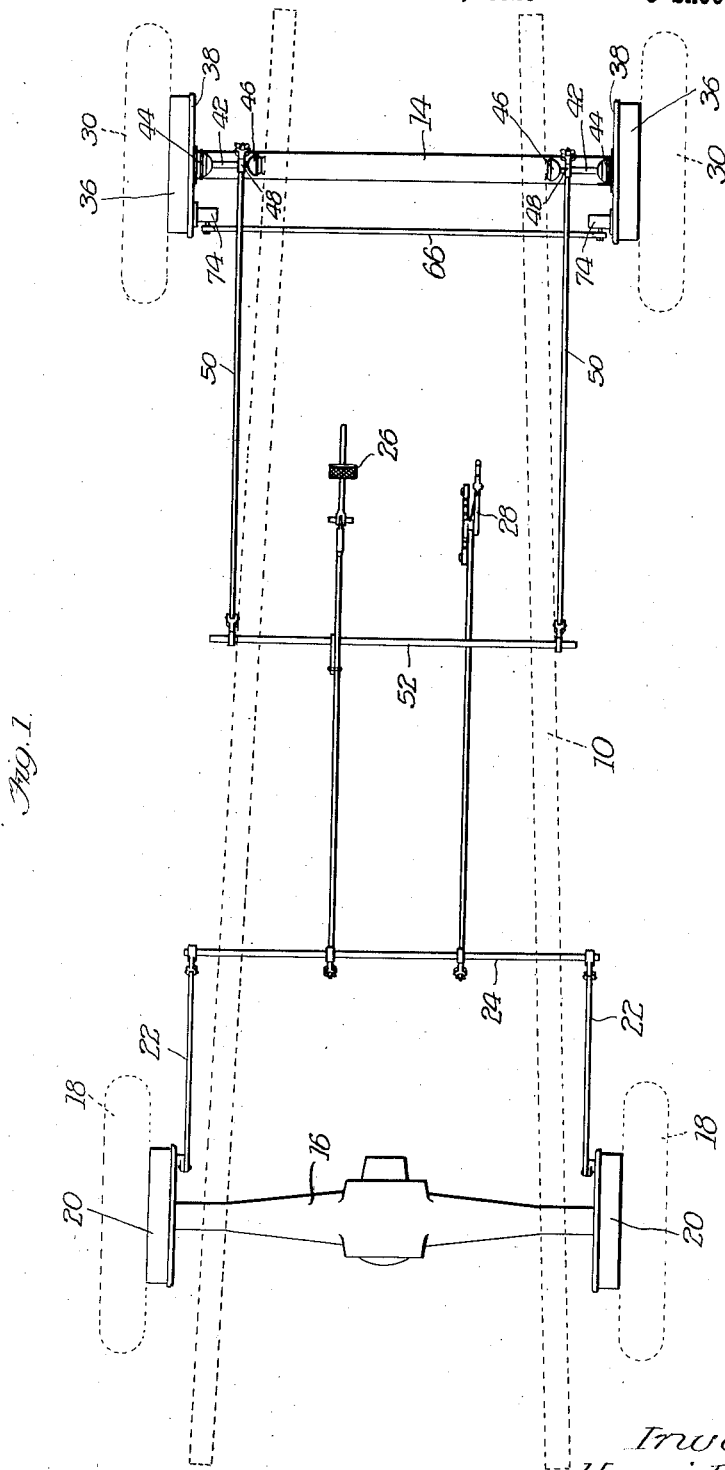

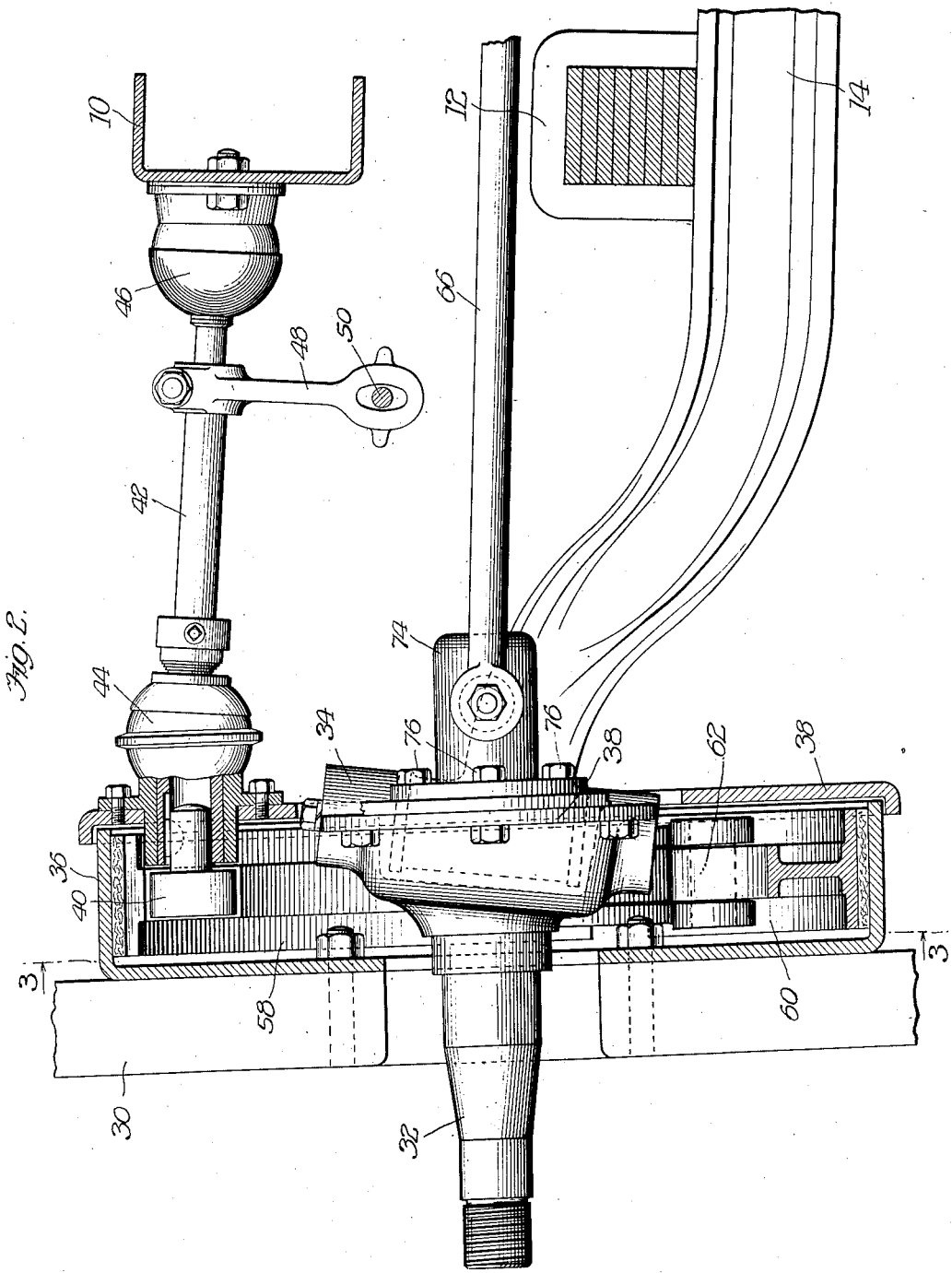

1,689,749

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

VEHICLE.

Application filed February 12, 1925. Serial No. 8,633.

This invention relates to the steering and braking mechanism of vehicles, and is illustrated as embodied in the chassis of an automobile. An object of the invention is to provide an efficient arrangement of parts which is less expensive than prior arrangements, in that certain functions of the steering and of the braking mechanisms are performed by the same parts, instead of requiring separate parts as heretofore.

Having this object in mind, the invention may be regarded as consisting in an arrangement in which one of the parts of the braking mechanism, as for example a backing plate, is used as part of the mechanism for swiveling the front wheels in steering, as for example by connecting the opposite ends of the cross tie rod of the steering mechanism to the backing plate or the like. Ordinarily the connection will take the form of a ball-and-socket or other universal joint, and if desired the backing plate may have the additional functions of supporting the brake anchor and the brake cam or its equivalent. In the accompanying illustrations, the backing plate carries the socket member of one or the other of several novel universal joints.

The above and other objects and features of the invention, including various novel combinations of parts and desirable particular constructions, will be apparent from the following description of the illustrative embodiments shown in the accompanying drawings, in which:

Figure 1 is a diagrammatic top plan view of an automobile chassis having brakes on all four wheels;

Figure 2 is a vertical transverse section, looking forward at part of the left front wheel and broken away so that at top and bottom the view is generally in the center plane of the wheel, while in the center it shows the backing plate of the brake and the cross tie rod of the steering mechanism in rear elevation;

Figure 3 is a vertical section on the line 3—3 of Figure 2, showing the brake shoes in side elevation;

Figure 4 is a horizontal section on the line 4—4 of Figure 3, showing the connection between the cross tie rod and the backing plate of the brake;

Figure 5 is a view corresponding to Figure 4, showing a modified construction of the connection between the cross tie rod and the backing plate of the brake;

Figure 6 is a view, looking from the right in Figure 5, showing the modified connection in side elevation;

Figure 7 is a view corresponding to Figure 4, but showing another modified connection; and Figure 8 is a similar view of a fourth modification of the connection.

Figures 1 and 2 show an automobile chassis including a frame 10 supported by springs 12 on a front axle 14 and rear axle 16. The rear wheels 18 are provided with brakes 20 operated by links 22 connected to a shaft 24 rocked either by a brake pedal 26 or an emergency brake lever 28.

Each one of the front wheels 30 is rotatably mounted on the spindle 32 of a knuckle 34 connected to the axle 14 by the usual king pin for swivelling steering movement around a generally vertical axis. Each front brake includes a drum 36 carried by the corresponding wheel 30, and a backing plate 38 secured to the corresponding knuckle 34.

The brakes shown are of the internal expanding type, operated by cams 40 rocked by telescopic shafts 42 connected to the cams through universal joints 44, and supported on the frame 10 by universal joints 46, joints 44 being above the king pins. Each shaft 42 has an arm 48 connected by a link 50 to a shaft 52 rocked by the pedal 26. Each brake is shown as including a reverse shoe 54 having an anchor 56, and primary and secondary shoes 58 and 60 pivotally connected at 62. Shoe 60 has a relatively large opening through which anchor 56 passes, and shoe 54 has a similar large opening for the anchor 64 of shoe 60.

Acording to the present invention, the two wheels are connected for simultaneous swivelling movement in steering, by a tie rod 66 connected at its opposite ends to parts of the brake mechanism, here shown as the backing plates 38, thus eliminating the usual steering arms.

In the modification of Figures 1–4, each end of the tie rod 66 carries a ball member 68, yieldingly held by a spring 70 between half sockets 72 forming, with member 68, a ball-and-socket joint. Sockets 72 and spring 70 are assembled in a pressed-metal housing 74, in the shape of a cup, secured to plate 38 by suitable bolts or the like 76. In Figures 5 and 6, housing 174 is turned around with respect to housing 74, and the spring 70 is held by a threaded plug 178. The housing 174 is secured to plate 38 by bolts or the like 176. In Figure 7 there is no spring 70, the half sockets 72 being held by a plug 278 threaded in the open end of housing 274. In Figure 8, the spring 370, corresponding to spring 70, is in the outer or closed end of a cup-shaped housing 374, corresponding to housing 74.

While several illustrative embodiments of my invention have been described in detail, it is not my intention to limit its scope to those particular embodiments, or otherwise than by the terms of the appended claim.

I claim:

In a front wheel knuckle having braking members, and a backing plate for said members, the combination therewith of a cup-shaped member secured to the plate, a pair of cooperating half-sockets in the cup-shaped member, a cross tie rod, and a ball carried by the tie rod and received between the half-sockets.

In testimony whereof I have hereunto subscribed my name.

HENRI PERROT